United States Patent [19]

Martin

[11] Patent Number: 4,888,076
[45] Date of Patent: Dec. 19, 1989

[54] METHOD OF COUPLING OPTICAL FIBERS ENBEDDED IN A MOLDED ARTICLE TO THE EXTERIOR THEREOF

[75] Inventor: David A. Martin, Northridge, Calif.

[73] Assignee: Lockheed Corporation, Calabasas, Calif.

[21] Appl. No.: 215,706

[22] Filed: Jul. 5, 1988

[51] Int. Cl.⁴ ............................................. B32B 31/04
[52] U.S. Cl. ..................... 156/245; 156/258; 156/293; 156/294; 156/296; 65/4.3; 350/96.20; 350/96.21; 427/162
[58] Field of Search .............. 65/4.3; 156/245, 258, 156/293, 294, 296; 427/162; 350/96.17, 96.20, 96.21, 96.34

[56] References Cited

U.S. PATENT DOCUMENTS

| | | | |
|---|---|---|---|
| 3,910,105 | 10/1975 | Hoffstedt | 73/88 A |
| 4,183,737 | 1/1980 | Chown et al. | 65/4 A |
| 4,477,146 | 10/1984 | Bowen et al. | 350/96.21 |
| 4,478,485 | 10/1984 | Khoe et al. | 350/96.20 |
| 4,487,474 | 12/1984 | Nishie et al. | 350/96.21 |
| 4,519,672 | 5/1985 | Rogstadius | 350/96.20 |
| 4,529,265 | 7/1985 | Toya et al. | 350/96.21 |
| 4,537,468 | 8/1985 | Degoix et al. | 350/96.21 |
| 4,544,234 | 10/1985 | DeVeau, Jr. et al. | 350/96.21 |
| 4,580,874 | 4/1986 | Winter et al. | 350/96.21 |
| 4,722,584 | 2/1988 | Kakii et al. | 350/96.20 |
| 4,729,624 | 3/1988 | Kakii et al. | 350/96.20 |
| 4,778,242 | 10/1988 | Ota et al. | 350/96.20 |

Primary Examiner—Caleb Weston
Attorney, Agent, or Firm—Louis L. Dachs

[57] ABSTRACT

The invention is a method of molding an article from a layed up preform having an optical fiber embedded therein, the optical fiber having at least one end for coupling to an external optical fiber. The method comprising the steps of: providing the optical fiber; providing a hollow tubular sleeve having first and second ends; inserting the at least one end of the optical fiber into the first end of said sleeve such that it extends through a portion thereof forming an optical fiber assembly; providing a mold; laying up the preform in the mold; embedding the optical fiber assembly into the preform simultaneously with the step of laying up the preform; molding the preform to form the article; and removing the molded articel from the mold.

8 Claims, 3 Drawing Sheets

METHOD OF COUPLING OPTICAL FIBERS ENBEDDED IN A MOLDED ARTICLE TO THE EXTERIOR THEREOF

TECHNICAL FIELD

The invention relates generally to the field of methods of incorporating sensors within structural members to measure damage or to transmit data therefrom and, in particular, to a method of coupling internally embedded optical fibers to external optical fibers.

BACKGROUND INFORMATION

The concept of embedding optical fibers in molded articles is not new. For example, U.S. Pat. No. 3,910,105 "Method for Detection of Flaws and Composite Fiberglass Structures" by D. J. Hoffstedt discloses a method for embedding optical fibers within molded structures. However, Hoffstedt generally limits his discussion to the incorporation of the optical fiber on a bond line between a face sheet and honeycomb core. Although the optical fiber is relatively small in diameter it creates a local discontinuity between the face sheet and honeycomb core. In molded composites, composed of filamentary reinforcement sheets preimpregnated with a resin, the sheets are individually layed up in a mold to form a preform which is subsequently molded. If the resin is a thermosetting type it is typically heated past the point of melting and flows to form a homogenous matrix and thereafter cures. If the resin is a thermoplastic it is also heated to a point wherein it melts but no chemical change occurs. The Hoffstedt approach could also be applied to these types of composite structures. However, if the optical fiber is embedded into such a composite structure composed of filamentary material (fibers) in a resin matrix, problems occur; the primary being that when an optical fiber is embedded, such that it is not parallel to adjacent fibers, these fibers must bend around the much larger diameter optical fiber, creating a structural weak point. In the past, with the Hoffstedt method this phenomenon could not be overcome except by always employing the optical fibers in parallel arrangement to adjacent structural fibers.

Applicants copending application, Ser. No. 735,619 "Method of Testing Composite Structures", filed May 20, 1985, discloses a significant improvement to the process of incorporate optical fibers in both of these types of structures by first arranging on or embedding the optical fiber in a layer of resin and thereafter laying it up into the mold. Thus, structural fibers which are not parallel to the optical fiber are not subjected to the radical bending to get around the optical fiber, but curve gradually therearound. Thus, this later invention provides the ability to arrange the optical fiber in efficient patterns instead of, as in the past, always placing the optical fiber parallel to the structural fibers. However, neither of these methods addressed the problem of how to effectively couple the embedded optical fiber to external optical fibers. In the past the optical fibers were just extended out of the molded structure which caused several problems:

(1) The mold had to somehow accommodate the free end of the optical fiber extending out of the layed up structure.

(2) The molding process and/or subsequent handling and installation of the structure into other assemblies would cause breakage of the optical fiber, particularly at the point of exiting from the structure.

(3) Most molded structures are trimmed after molding which requires that the optical fiber be cut at this point greatly complicating the coupling of an external optical fiber thereto. It is readily apparent that this is not a desirable thing to do.

There are numerous methods in the prior art for coupling optical fibers to each other. For example, U.S. Pat. No. 4,183,737 "Method of Joining Optical Fibers with a Link Piece" by M. Chown et al., U.S. Pat. No. 4,477,146 "Optical Waveguide Connector" by T. P. Bower et al., U.S. Pat. No. 4,487,474, "Optical Connector with Ceramic Plugs and Sleeve" by M. Nishie et al., U.S. Pat. No. 4,519,672 "Method for Obtaining an Accurate Concentric Fastening of an Optical Fibre in a Connector" by I. Rogstadius, U.S. Pat. No. 4,529,265, "Optical Fiber Joints and Method of Joining Optical Fibers" by S. Toya et al., U.S. Pat. No. 4,537,468 "Reinforced Optical Fiber Butt Weld Connection" by B. Degoix et al., U.S. Pat. No. 4,454,234, "Low Loss Optical Fiber Splicing" by G. F. DeVeau Jr. et al., and U.S. Pat. No. 4,580,874, "Optical Fiber Cable Repair and Joining Technique and Kit for Performing the Same" by J. Winter et al., U.S. Pat. No. 4,478,485 "Connector for Coupling at Least One Optical Fiber to a Further Optical Element" by Khoe et al. All these coupling devices require access to the ends of both of the optical fibers to be joined and are not applicable to the problem at hand.

Thus, it is a primary object of the subject invention to provide a method of connecting optical fibers within a molded structure to external optical fibers.

It is another primary object of the subject invention to provide a method of embedding optical fibers within a molded structure, requiring peripheral trimming to a final shape after molding, to an external optical fiber.

It is a further object of the subject invention to provide a method of embedding optical fibers within a molded structure while providing a simple means of joining the embedded optical fiber to an external optical fiber.

It is a still further object of the subject invention to provide a method of embedding optical fibers within a molded structure, wherein the connection between the embedded optical fiber and the external optical fiber require little or no space and does not unduly effect the strength of the structure nor complicates the design thereof.

DISCLOSURE OF THE INVENTION

The typical procedure for making composite structures composed of filamentary material in a resin matrix is to use preimpregnated sheets of the fibers. For example, fibers are impregnated with a thermosetting resin and partially cured, commonly called B stage, so that the sheets, while tacky, can still be easily handled. The individual sheets are layed up in a mold with the sheets in the desired orientation; thereafter this preform is vacuum bagged and heat cured under pressure. Most, if not all of these types of parts require some sort of peripheral trimming to a final shape. Thermoplastic resin matrix composites are manufactured in a similar fashion, however, since thermoplastic resins do not cure, different methods are used to make the preimpregnated sheets. Thus, with the molded structure made of a great many layers of fiber sheets impregnated with the resin it is easy to incorporate optical fibers therewithin during the lay up process. This is fully discussed in the Hoffstedt patent and applicant's copending application herein incorporated by reference.

In detail, the invention is a method of molding an article from a laid up preform with optical fibers embedded therein. Typically, the preform is laid up from sheets of filamentary material reinforcements and impregnated with partially cured resins which makes it a simple matter to embed then the optical fiber therein during the lay up of the preform. The main thrust of the invention is to provide a method of efficiently connecting the embedded optical fiber to external optical fibers after the molding process is completed. The method is as follows:

1. Providing the optical fiber;
2. Providing a hollow tubular sleeve having first and second ends. The sleeve is typically a glass or metallic capillary tube having an inside diameter sufficient to allow the insertion of the optical fibers therein.
3. The end of the optical fiber is inserted into the first end of the sleeve such that it extends only partially therethrough forming an optical fiber assembly. The first end is then sealed to the optical fiber and the second end is also sealed. Prior to sealing the second end the remaining portion of the sleeve (not having the end of the optical fiber therein) can be filled with material such as glass microbeads used to calibrate particle counters;
4. Providing a mold;
5. The optical fiber assembly is then embedded into the preform simultaneously during the step of laying up the preform in the mold.
6. Molding the preform into the article;
7. Removing the molded article from the preform.

If the molded article is one that does not require trimming of at least a portion of its periphery after molding, the optical fiber is embedded such that the second end of the sleeve extends at least to the edge of the molded article such that the second end thereof can be open. However, most such molded articles do require trimming of at least a portion of the periphery of the article to reach final shape. Whether or not trimming is required is dependent upon the article molding technique used. If this is the case however, then the optical fiber assembly is positioned during the step of embedding such that at least a portion of the sleeve that does not include the end of the fiber (i.e. the remaining portion of the sleeve) is positioned in the portion of the periphery of the article to be subsequently trimmed. Thus, after the molded article is removed from the mold the peripheral portion is removed cutting open the sleeve. Once the sleeve is opened the end of an external optical fiber can be inserted into the sleeve in optical contact with the embedded optical fiber. To achieve good light transmission the ends of both the embedded and external optical fibers should have focusing lenses attached thereto. This can be provided by fusing a lens on the ends of the optical fibers or attaching a microlens thereto. Alternately, the end of the optical fiber can be cleaved or polished which in many cases will provide adequate light transmission.

The novel features which are believed to be characteristic of the invention, both as to its organization and method of operation, together with further objects and advantages thereof, will be better understood from the following description in connection with the accompanying drawings in which the presently preferred embodiments of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a top view of molded structure having optical fibers embedded therein.

Illustrated in FIG. 2 is a partial cross-sectional view of the structure shown in FIG. 1, taken along the line 2—2.

Figure 1:
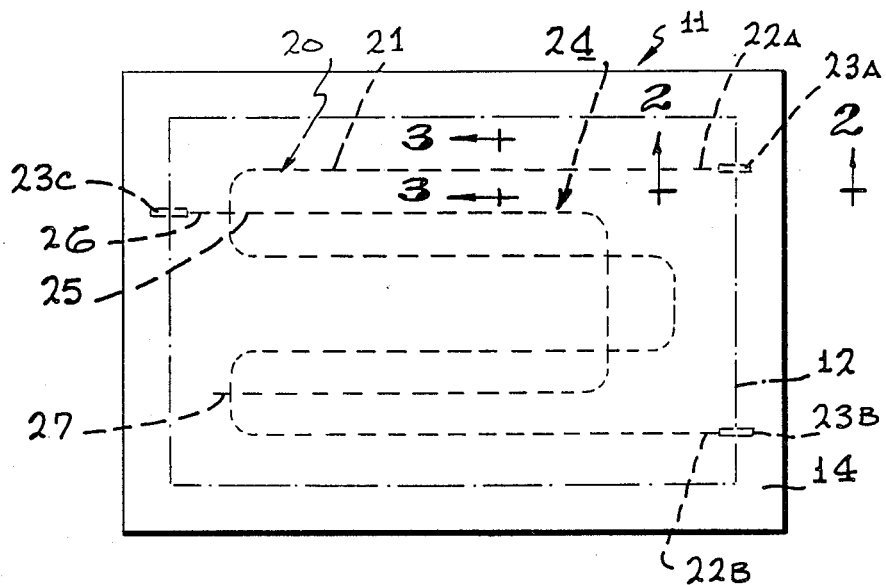
Figure 3:
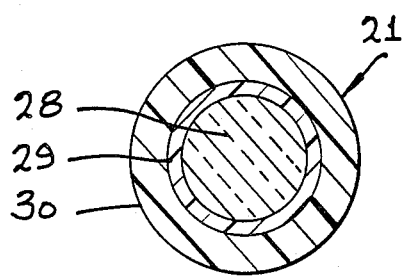

Illustrated in FIG. 3 is a cross-sectional view of an optical fiber embedded in the structure shown in FIG. 1, taken along the line 3—3.

Figure 2:
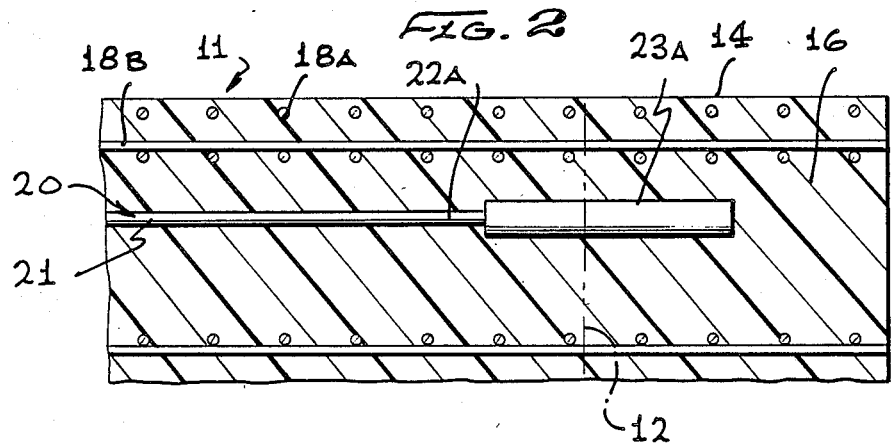
Figure 4:
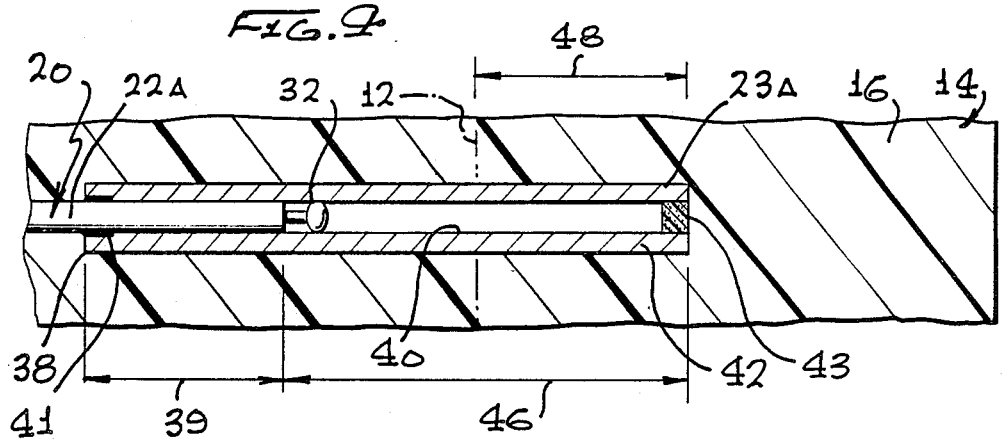

Illustrated in FIG. 4 is an enlarged partial view of FIG. 2 showing an end of the embedded optical fiber installed in a hollow tubular sleeve.

Figure 5:
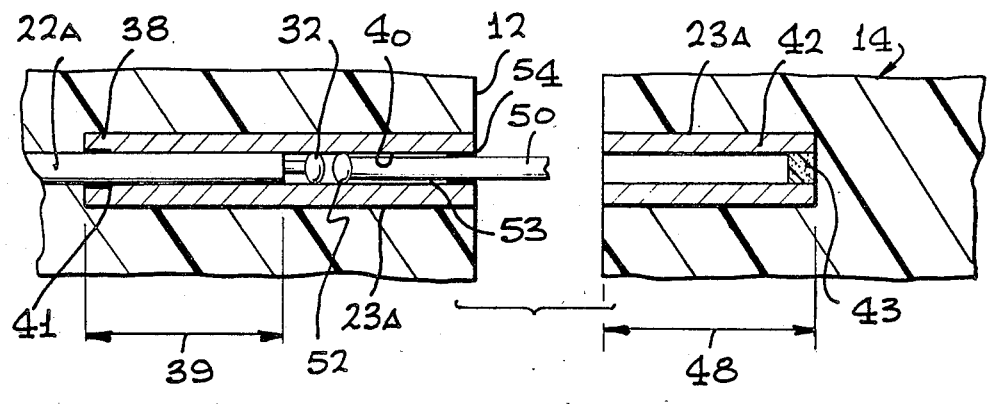

Illustrated in FIG. 5 is a view similar to FIG. 4 with the structure trimmed to its final shape and the portion that has been trimmed; and further illustrating an external optical fiber coupled to the trimmed structure.

Figure 6:
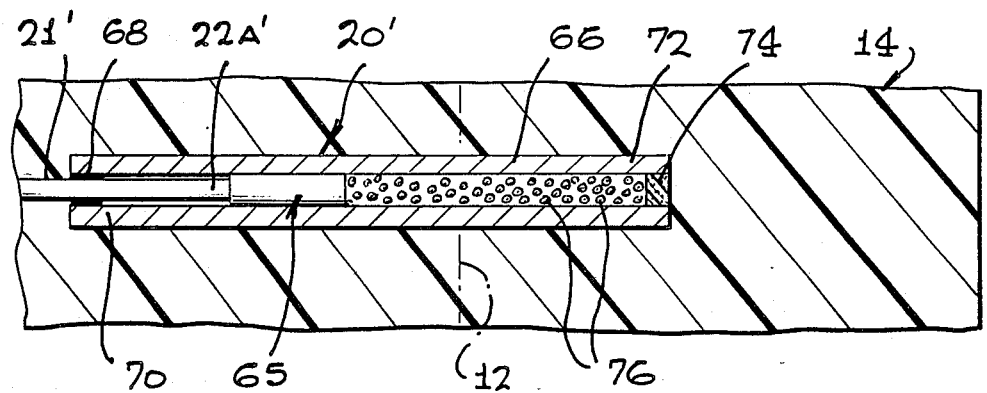

Illustrated in FIG. 6 is a view similar to FIG. 4 except that a special lens assembly is attached to the end of the embedded optical fiber and the tubular sleeve is filled with glass beads.

Figure 7:
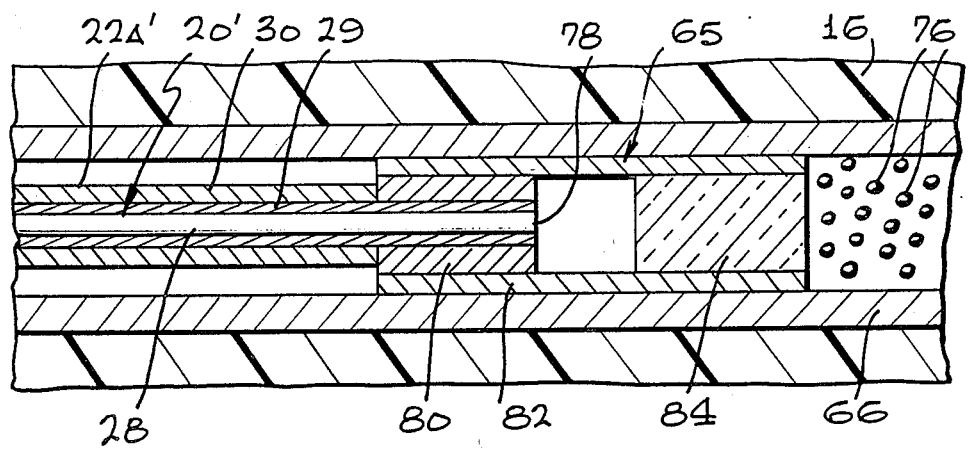

Illustrated in FIG. 7 is an enlarged cross-sectional view of the special lens assembly shown in FIG. 6.

Figure 8:
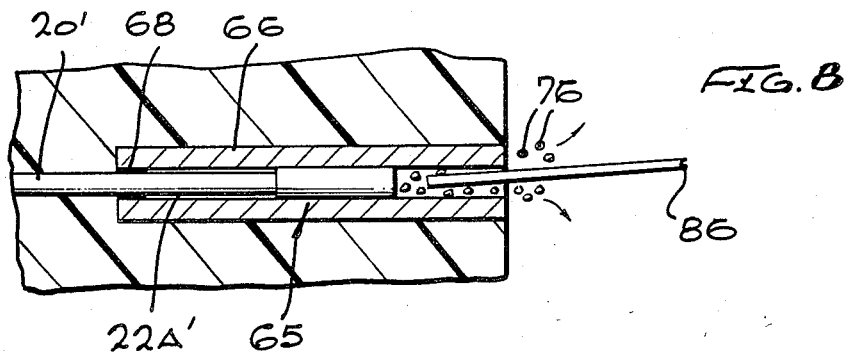

Illustrated in FIG. 8 is a view similar to FIG. 6 except that the structure has been trimmed to its final shape and a method of removing the glass beads is illustrated.

Figure 9:
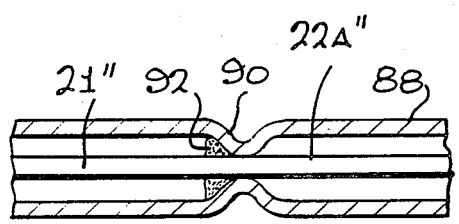

Illustrated in FIG. 9 is an enlarged partial view of the optical fiber installed in a second embodiment of a hollow tubular sleeve.

Figure 10:
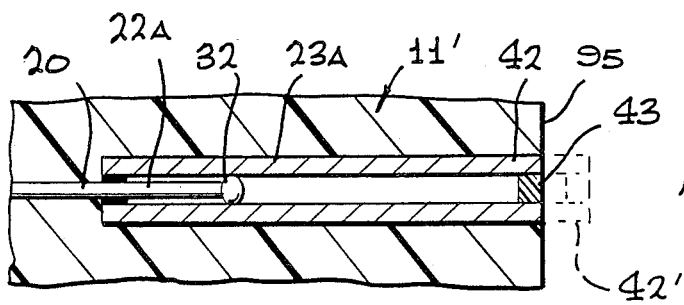

Illustrated in FIG. 10 is a cross-sectional view of a structure that does not require trimming after molding showing the end of the optical fiber installed in a hollow tubular sleeve flush with or extending slightly beyond the periphery of the structure.

BEST MODE FOR CARRYING OUT THE INVENTION

Illustrated in FIG. 1 is a top view of a molded structure designated by numeral 1, while illustrated in FIG. 2 is a cross-sectional view of the structure 10 shown in FIG.1 taken along the line 2—2. The structure 11, as illustrated, is a composite structure that has a final net shape portion 12 and a peripheral portion 14 thereabout which is, trimmed therefrom after molding. For purposes of illustration, the structure 11 is made of a composite material having a resin matrix, identified by numeral 16, with filamentary material reinforcements (fibers) 18A and 18B disposed therein at right angles to each other. The orientation of the reinforcements 18A and 18B are typically dictated by structural requirements and the orientation indicated is for purposes of description only. Embedded within the structure 11 is a first optical fiber assembly 20 comprising an optical fiber 21 having ends 22A and 22B attached to hollow tubular sleeves 23A and 23B, respectively, which extend into the peripheral portion 14. It should be noted that the optical fiber assembly is shown enlarged in relationship to surrounding structures for purposes of illustration.

Structural damage can be detected should a light being passed through the optical fiber assembly 20 be interrupted or significantly reduced in intensity because of a local failure of the structure causing breakage or cracking of the optical fiber 21. This is more fully discussed in Applicant's previously referenced copending patent application and the patent to Hoffstedt. Alternately, the optical fiber assembly could be coupled to internally mounted sensors, etc. A second optical fiber assembly 24 comprising an optical fiber 25 having a first end 26 coupled to a hollow tubular sleeve 23C extending into the peripheral portion 14 and having a second end 27 terminating within the portion 12 of the structure 11. Here a Time Domain Reflectometer (not shown) can be used to locate the position of a fault within the portion 12.

Referring now to FIG. 3 which is a cross-sectional view of the optical fiber 21 taken along the line 3—3 of FIG. 1, it can be seen that the fiber 21 comprises a core 28 which actually transmits the light, a cladding 29 and a protective buffer coating 30. A typical optical fiber useful in this application would have a 100 micron diameter core, a cladding layer increasing the diameter to 110 microns and a buffer coating increasing the diameter to 140 microns overall. Thus, it can be seen that for purposes of illustration the optical fiber assembly has been enlarged relative to the structure 11. Illustrated in FIG. 4 is an enlarged view of a portion of FIG. 2 including the optical fiber assembly 20 and sleeve 23A. When the layers of the filamentary material reinforcements 18A and 18B, which usually are provided with preimpregnated resin 16 are layed up in a mold to form a preform, the optical fiber assembly 21 and 24 are simultaneously layed up at the appropriate point. Note that the optical fiber assemblies could be first embedded or arranged upon in a resin layer as set forth in Applicant's previously mentioned copending patent application.

Before embedding the optical fiber cable assembly 20 a focusing lens of some sort should be mounted to the end 22A to provide efficient light transmission out of the optical fiber 21. This can be accomplished by fusing a lens 32 on the end thereof. Cannons Microelectronic Technology Division, Fountain Valley, California, has a method on the market for accomplishing such an operation. Their process, fiber lens fusing, flashes a brief, high frequency arc (about 6,500 VAC) between two electrodes across the fiber end. The arc melts the tip of the glass, which cools to form a spherical lens. The result is a lens that is nearly ideal for transmission of optical signals. The end 22A with lens 32 formed thereon is then inserted into end 38 of the sleeve 23A extending through a first portion, indicated by numeral 39 thereof. A suitable sleeve material is flexible fused silica capillary tubing which can be procured from Polymicro Technologies, Phoenix, Ariz. The inside diameter 40 of the sleeve 23A should be selected such that there is a snug fit between it and the optical fiber end 22A. Thereafter, the end 22A of the optical fiber 20 is sealed to the end 38 of the sleeve 23A by means of adhesive 41. The second end 42 of the sleeve is sealed with adhesive 43. However with some resins, because of their high viscosity when melted, sealing of the sleeve may not be necessary, since no flow will occur therein. Optimally, the end 42 can be fused closed. The end 22B of the optical fiber 20 is similarly prepared by forming a fused lens thereon and joining to the sleeve 23B. At this point, the optical fiber assembly 20 is ready for embedding into the preform such that the portion 39 of the sleeve 23A completely lies within the portion 12 of the structure and the remaining portion 46 extends into the portion 14 to be subsequently trimmed, such that when the structure is trimmed a portion, indicated by numeral 48, of the sleeve 23A is removed. The optical fiber assembly 24 is similarly treated.

Referring now to FIG. 5 which is a view similar to FIG. 4, it can be seen that after the structure 11 (preform) has been molded, the portion 14 is trimmed away. This exposes the interior of the sleeve 23A. Thereafter, a second optical fiber 50 having a fused optical lens 52 is inserted into the cut off open end 53 of the sleeve 23A, in proximity to lens 32 such that the sufficient transmission of light from fiber end to fiber end is achieved. Thereafter, the cut off open end 53 is sealed to optical fiber 50 by adhesive 54 or by other means.

Illustrated in FIG. 6 is a second method of providing a focusing lens for the ends of the optical fiber. As illustrated, end 22A' of the embedded optical fiber assembly 21' of the optical fiber assembly 20' is installed in an optical coupling assembly 65 and which in turn is installed in a hollow tubular sleeve 66 (similar to sleeve 23A shown in FIG. 4, but larger in diameter). The sleeve 66 is sealed by adhesive 68 at its end 70 to end 22A' of the fiber 21' and at its opposite end 72 by adhesive 74. Since the sleeve 66 is larger in diameter, but still under 1,000 micrometers in diameter, the interior of the sleeve 66 is filled with a material such as glass beads 76 or the like of a very small diameter such as those used to calibrate particle counters. This prevents debris from entering the sleeve during subsequent trimming operations. However, this is an optional step.

Referring now to FIG. 7, which is a partial view of FIG. 6 with the optical coupling assembly 65 in cross-section, it can be seen that the end 22A' of the optical fiber 20' has a portion of the buffer layer 30 stripped away from the cladding 29 and core 28. The end 78 is ground flat and installed in a retainer 80 and adhesively bonded thereto. The retainer 80 in turn is installed in a hollow sleeve 82 along with a lens 84, both of which are bonded in place. The lens 84 is a SELFOC microlens, distributed by NSG America, Inc., Los Angeles, Calif. The SELFOC microlens is cylindrical with a parabolic refractive index distribution which is highest at its optical axis and decreases toward its periphery. Light travels sinusoidally through the graded index material and by varying the pitch length of the lens, the exiting light can be collimated, focussed or made divergent. This lens performs the same optical functions at standard spherical lenses with the added benefit that the end surfaces are flat.

Referring now to FIG. 8, which is a view similar to FIG. 6 but after trimming, it is apparent that, the microbeads 76 can be easily removed by insertion of a hollow needle 86 (coupled to a source of nitrogen gas or alcohol under pressure (not shown)) into the sleeve 66 and thereafter blowing out the glass beads 76. Thereafter, an external optical fiber having an optical fiber coupling assembly 65 attached thereto can be inserted and joined to the sleeve as previously described.

Illustrated in FIG. 9 is a partial view of an alternate sleeve design. Here the sleeve 88 is made of metal and crimped down at a point 90 to secure and seal it to the end 22A" of the optical fiber 21". A spot of adhesive 92 can be applied to the crimped portion to further ensure a seal.

While the methods so far described have dealt with structures that require trimming after molding the method can be used with molded structures that do not require such trimming to final shape. For example, illustrated in FIG. 10 is a partial cross-sectional view of a structure 11' which does not require trimming after molding. An optical fiber assembly 20 has been installed with the end 42 of the sleeve 23A flush to the surface 95 of the structure 11'. The adhesive 43 can easily be removed with a pick or microdrill (not shown) to expose the interior thereof. If the mold allows, the end 42 of the sleeve 23A can be extended slightly (indicated in dotted lines and numeral 42') providing easy external access to the sleeve or alternately the end could be cut off. Finally, while the discussion has been centered on composite materials it must be understood that the method is applicable to all types of molded articles.

While the invention has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

Industrial Applicability

The invention has applicability to structures that require mounting of internal sensors and the like.

I claim:

1. A method of making molded article from a preform made up of moldable materials having an optical fiber embedded therein, the optical fiber having at least one end for coupling to an external optical fiber, the method comprising;
   providing an optical fiber having at least one end for coupling to an external optical fiber;
   providing a hollow tubular sleeve having first and second ends;
   inserting said at least one end of said optical fiber into said first end of said sleeve such that it extends through a portion thereof forming an optical fiber assembly;
   providing a mold;
   laying up the preform in said mold; embedding said optical fiber assembly in said preform simultaneously with the step of laying up the preform;
   molding said preform to form the article; and removing the article from said mold.

2. The method as set forth in claim 1 wherein during said step of embedding said optical fiber assembly simultaneously with said step of laying up the preform in said mold, said second end of said sleeve is sealed and embedded in said layed up preform such that said second end of said sleeve extends at least to the periphery of the preform.

3. The method as set forth in claim 2 wherein after the step of removing said molded article from said mold the step of opening said sealed second end of said sleeve.

4. The method as set forth in claim 3 wherein the article requires at least a portion of the periphery of the preform to be trimmed after the step of molding the preform, the method including the additional steps of;
   during the steps of embedding said optical fiber assembly within said preform, said optical fiber assembly is positioned in said preform such that at least a portion of the remaining portion of said sleeve extends into the at least a portion of said preform to be trimmed; and
   after the step of molding said preform into the article the additional steps of;
   removing the molded article from said mold; and trimming the at least a portion of the peripheral portion to be trimmed such that the portion of said sleeve therewithin is removed.

5. The method as set forth in claim 3 or 4 wherein prior to said step of inserting at least one end of said optical fiber into said first end of said sleeve, the step of mounting a focussing lens on the end thereof.

6. The method of as set forth in claim 5, including the additional steps after the step of removing the said molded article from said mold;
   providing a second optical fiber having an end; and after the step of openning said second end of said sleeve, the steps of;
   inserting said end of said second optical fiber into said open end of said second end of said sleeve; and
   sealing said second end of said sleeve to said end of said second optical fiber.

7. The method as set forth in claim 6 including the additional steps of:
   prior to the step of sealing said second end of said sleeve, the step of filling said remaining portion of said sleeve with material; and
   after the second end of said sleeve is open the step of removing said material.

8. The method as set forth in claim 7, wherein said material is composed of microbeads.

* * * * *